United States Patent
Lee (10) Patent No.: US 10,939,278 B2
(45) Date of Patent: Mar. 2, 2021

(54) METHOD AND DEVICE FOR PERFORMING COMMUNICATION IN WIRELESS COMMUNICATION SYSTEM

(71) Applicant: Samsung Electronics Co., Ltd., Gyeonggi-do (KR)

(72) Inventor: Hyewon Lee, Seoul (KR)

(73) Assignee: Samsung Electronics Co., Ltd

( * ) Notice: Subject to any disclaimer, the term of this patent is extended or adjusted under 35 U.S.C. 154(b) by 95 days.

(21) Appl. No.: 16/303,459

(22) PCT Filed: May 30, 2017

(86) PCT No.: PCT/KR2017/005606
§ 371 (c)(1),
(2) Date: Nov. 20, 2018

(87) PCT Pub. No.: WO2018/004133
PCT Pub. Date: Jan. 4, 2018

(65) Prior Publication Data
US 2020/0267532 A1   Aug. 20, 2020

(30) Foreign Application Priority Data

Jun. 29, 2016   (KR) .......................... 10-2016-0081888

(51) Int. Cl.
*H04W 8/18* (2009.01)
*H04W 8/02* (2009.01)
*H04W 8/20* (2009.01)

(52) U.S. Cl.
CPC ............. *H04W 8/183* (2013.01); *H04W 8/02* (2013.01); *H04W 8/205* (2013.01)

(58) Field of Classification Search
CPC ....... H04W 8/183; H04W 8/02; H04W 8/205; H04W 48/18; H04W 12/06; H04W 88/06;
(Continued)

(56) References Cited

U.S. PATENT DOCUMENTS 9,357,372 B1   5/2016   Ridel et al.
2004/0073786 A1   4/2004   O'Neill et al.
(Continued)

FOREIGN PATENT DOCUMENTS

EP   3 016 420   5/2016
KR   20090007618   1/2009
(Continued)

OTHER PUBLICATIONS

European Search Report dated Feb. 11, 2019 issued in counterpart application No. 17820410.3-1214, 9 pages.
(Continued)

*Primary Examiner* — Ernest G Tacsik
(74) *Attorney, Agent, or Firm* — The Farrell Law Firm, P.C.

(57) ABSTRACT

Provided are a method and device for performing communication in a wireless communication system. According to an embodiment of the present disclosure, a method for performing communication in a wireless communication system may include: installing at least one global profile (GP); activating a first GP if a location is supported by the first GP among the at least one installed GP; installing a local profile (LP) for supporting communication at the location by using the first GP; and performing wireless communication by using the first GP or the LP based on whether the LP installation is successful.

15 Claims, 9 Drawing Sheets

(58) Field of Classification Search
CPC ... H04W 12/0023; H04W 12/04; H04W 4/24; H04W 8/18; H04W 8/06; H04W 8/26; H04W 4/50
See application file for complete search history.

(56) References Cited

U.S. PATENT DOCUMENTS

| | | | | |
|---|---|---|---|---|
| 2011/0269461 | A1* | 11/2011 | Xu | H04W 8/183 455/435.2 |
| 2012/0108204 | A1* | 5/2012 | Schell | H04W 8/205 455/411 |
| 2012/0108206 | A1 | 5/2012 | Haggerty | |
| 2012/0260090 | A1 | 10/2012 | Hauck et al. | |
| 2013/0336235 | A1* | 12/2013 | Meyer | H04L 67/20 370/329 |
| 2014/0128034 | A1 | 5/2014 | Xu | |
| 2014/0274034 | A1 | 9/2014 | Trapp | |
| 2015/0004967 | A1* | 1/2015 | Jiang | H04M 15/8033 455/433 |
| 2015/0180514 | A1* | 6/2015 | Pavacic | H04B 1/0458 455/552.1 |
| 2015/0319603 | A1 | 11/2015 | Faller et al. | |
| 2016/0021539 | A1 | 1/2016 | Piscopo, Jr. et al. | |
| 2016/0246611 | A1* | 8/2016 | Li | H04W 12/08 |

FOREIGN PATENT DOCUMENTS

| | | |
|---|---|---|
| KR | 20150113954 | 10/2015 |
| WO | WO 2014/020237 | 2/2014 |

OTHER PUBLICATIONS

PCT/ISA/210 Search Report issued on PCT/KR2017/005606 (pp. 7).

PCT/ISA/237 Written Opinion issued on PCT/KR2017/005606 (pp. 4).

* cited by examiner

METHOD AND DEVICE FOR PERFORMING COMMUNICATION IN WIRELESS COMMUNICATION SYSTEM

PRIORITY

This application is a National Phase Entry of PCT International Application No. PCT/KR2017/005606 which was filed on May 30, 2017, and claims priority to Korean Patent Application No. 10-2016-0081888, which was filed on Jun. 29, 2016, the content of each of which is incorporated herein by reference.

TECHNICAL FIELD

Various embodiments of the present disclosure relate to a wireless communication system, and more particularly, to a method and device for easily using wireless communication at the time of roaming.

BACKGROUND ART

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system.

To achieve a high data transmission rate, the 5G communication system is considered to be implemented in a super high frequency (mmWave) band (e.g., like 60 GHz band). To relieve a path loss of a radio wave and increase a transfer distance of the radio wave in the super high frequency band, in the 5G communication system, beamforming, massive MIMO, full dimensional MIMO (FD-MIMO), array antenna, analog beam-forming, and large scale antenna technologies have been discussed.

Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed.

In addition to this, in the 5G system, hybrid FSK and QAM modulation (FQAM) and sliding window superposition coding (SWSC) that are an advanced coding modulation (ACM) scheme and a filter bank multi carrier (FBMC), a non orthogonal multiple access (NOMA), and a sparse code multiple access (SCMA) that are an advanced access technology, and so on have been developed.

Meanwhile, there is a need for a method for enabling a user to use a wireless communication service at low cost at the time of roaming.

DISCLOSURE OF INVENTION

Technical Problem

An object of the present disclosure is directed to provision of a method and device for performing wireless communication by installing a local profile by allowing a terminal to activate a global profile at the time of roaming.

Solution to Problem

Various embodiments of the present disclosure are directed to the provision of a communication method of a terminal, including: installing at least one global profile (GP); activating a first GP if a location is supported by the first GP among the at least one installed GP; installing a local profile (LP) for supporting communication at the location by using the first GP; and performing wireless communication by using the first GP or the LP based on whether the LP installation is successful.

Various embodiments of the present disclosure are directed to the provision of a terminal, including: a transceiver configured to transmit and receive a signal; and a controller configured to install at least one global profile (GP), activate a first GP if a location is supported by the first GP among the at least one installed GP, install a local profile (LP) for supporting communication at the location through the transceiver by using the first GP, and control the transceiver to perform wireless communication by using the first GP or the LP based on whether the LP installation is successful.

Advantageous Effects of Invention

According to the embodiment of the present disclosure, the terminal may activate the global profile at the time of the roaming to install the local profile, thereby performing the wireless communication at low cost.

MODE FOR THE INVENTION

Hereinafter, embodiments of the present disclosure will be described in detail with reference to the accompanying drawings.

In describing the exemplary embodiments of the present disclosure in the present specification, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function(s). Further, it is to be noted that functions mentioned in the blocks occur regardless of a sequence in some alternative embodiments. For example, two blocks that are contiguously illustrated may be substantially simultaneously performed in fact or be performed in a reverse sequence depending on corresponding functions sometimes.

Here, the term '-unit' used in the present embodiment means software or hardware components such as FPGA and ASIC and the 'unit' performs any roles. However, the meaning of the '~unit' is not limited to software or hardware. The '~unit' may be configured to be in a storage medium that may be addressed and may also be configured to reproduce one or more processors. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

The terminal according to the embodiment of the present disclosure may generally include a mobile terminal and may indicate a device that is joined in a mobile communication system to receive a service from the mobile communication system. The mobile terminal may include smart devices such as a smart phone and a tablet PC, which is merely an example, and the present disclosure is not limited thereto.

In general, when roaming is generated while a terminal performs wireless communication, higher costs are incurred than costs for the wireless communication originally used. In particular, there is a case where an excessive cost is imposed on the terminal at the time of overseas roaming, and as a result, a user may not be able to freely use a wireless communication service at the time of the overseas roaming.

Accordingly, various methods for freely using, by a terminal, a wireless communication service even at the time of overseas roaming have been proposed.

For example, a method for using traffic provided by a mobile virtual network operator (MVNO) supporting global roaming in at least one country or a method for installing a local profile (LP) of a local operator, that is operating a network in a visiting country, in an embedded SIM (eSIM) (or electronic SIM) of a user terminal when a user visits overseas and using the installed LP to perform wireless communication is used.

However, when the global MVNO scheme is used, one global MVNO generally supports global roaming in some countries. Therefore, a global MVNO operator may not support global roaming at the user's location at the time of roaming. In addition, there is a disadvantage in that the global MVNO is relatively more expensive than the LP.

In addition, when the LP is used, the terminal needs to access a profile server using a provisioning profile (PP) already installed in the user terminal to install the LP. At this time, the PP already installed is generally a profile for a network operator of a user's own country. Therefore, there is a disadvantage in that the overseas roaming is used before the wireless communication is performed using the LP, and therefore the wireless communication may be used at a relatively expensive fee.

Accordingly, the present disclosure proposes a method for installing LP by activating an installed global profile (GP) when a terminal in which at least one global MVNO profile is installed in the GP detects roaming in order to use the wireless communication at low cost and enabling a user to perform wireless communication using the installed LP.

In detail, FIGS. 1A to 1E are diagrams illustrating a method for activating and installing an eSIM profile of a terminal according to an embodiment of the present disclosure.

Figure 1A:
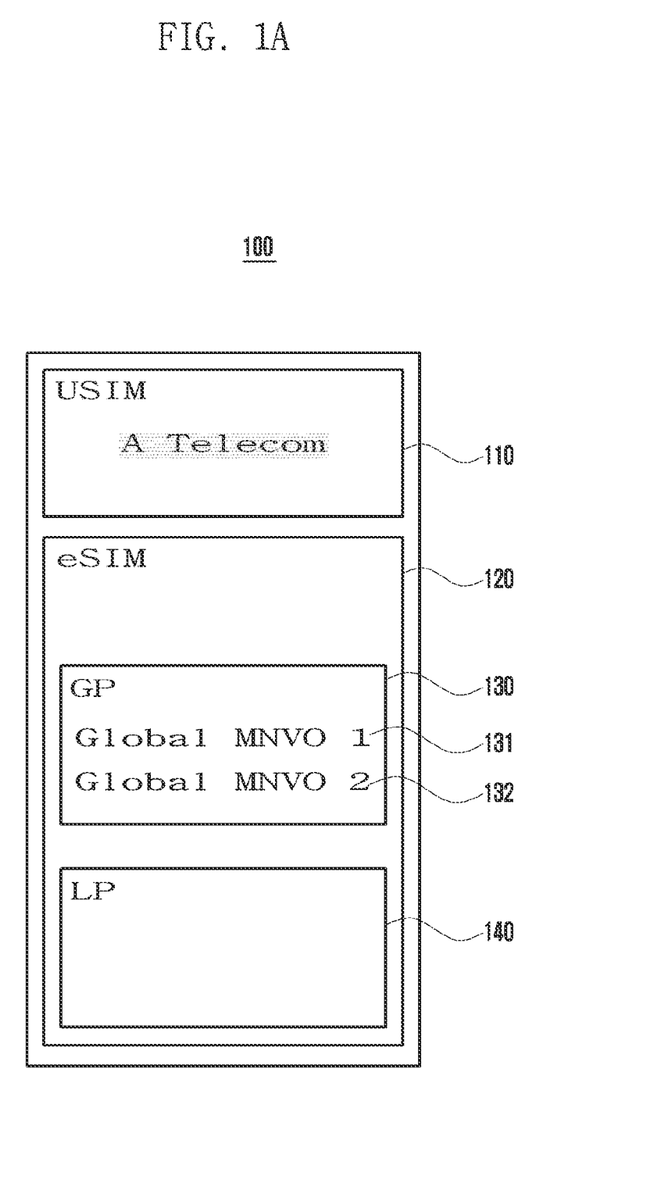
FIGS. 1A to 1E are diagrams illustrating a method for activating and installing an eSIM profile of a terminal according to an embodiment of the present disclosure.

FIG. 1A is a diagram illustrating a configuration included in a dual-SIM terminal 100 including a USIM and an eSIM, respectively.

The terminal 100 may include a universal subscriber identity module (USIM) 110 as the SIM. The USIM is a form in which a SIM card including subscriber information is combined with a universal IC card (UICC). However, the USIM is merely one embodiment, but is not limited thereto.

The USIM 110 of the terminal 100 may include subscriber information for using a wireless communication service provided by a domestic (area where the terminal 100 is opened) operator. Accordingly, users located in a country can use the USIM 110 to use a wireless communication service provided by an operator that the user contracts.

On the other hand, according to the embodiment, a domestic operator may also provide the eSIM. In this case, a profile provided by the domestic operator may be installed in the eSIM of the terminal 100. Through the profile, the user can use the wireless communication service provided by the operator.

According to an embodiment of the present disclosure, FIGS. 1A to 1E illustrates that a USIM provided by a domestic operator 'A Telecom' is mounted.

The terminal 100 may include an eSIM 120 separately from the USIM 110. The eSIM 120 may include a GP region 130 in which at least one global profile (GP) may be installed.

The global profile (hereinafter, GP) is a profile for using a wireless communication service of a mobile virtual network operator (MVNO) supporting global roaming in at least one country.

The global MVNO may be an operator that provides a mobile communication service by renting a communication network from a mobile network operator (MNO) having a mobile communication network in at least one country.

Accordingly, at the time of roaming, the GP of the at least one global MVNO may be installed in the eSIM 120 of the terminal 100 to utilize a wireless communication service provided by the at least one global MVNO.

According to an embodiment of the present disclosure, FIG. 1A illustrates that 'Global MVNO 1' 131 and 'Global MVNO 2' 132 GP are installed in the GP region 130. For example, the 'Global MVNO 1' 131 is a GP of an operator that supports global roaming in the US and Canada, and the 'Global MVNO 2' 132 is a GP of an operator supporting global roaming in China and India. In addition, the installation of two GPs in the GP region 130 is merely one embodiment, and the number of installed GPs is not limited.

Meanwhile, the eSIM 120 may include an LP region 140 in which a local profile (LP) may be installed. At least one LP may be installed in the LP region 140.

The LP may be a profile of an operator supporting the wireless communication service at the location of the terminal 100. For example, when the terminal 100 in which the SIM 110 of a Korean operator is installed by being subscribed in the wireless communication service in Korea moves to the US, a profile of the US operator supporting the wireless communication service in the US may be installed in the LP region 140. A user can use the wireless communication service in the US by using the profile of the US operator installed in the LP region 140 of the terminal 100.

Generally, a method for installing an LP at the time of roaming and using a wireless communication network of an operator in a roaming area using the installed LP is a method for enabling a user to use wireless communication at the lowest cost.

Hereinafter, a method for installing an LP to use wireless communication at low cost will be described.

Figure 1B:
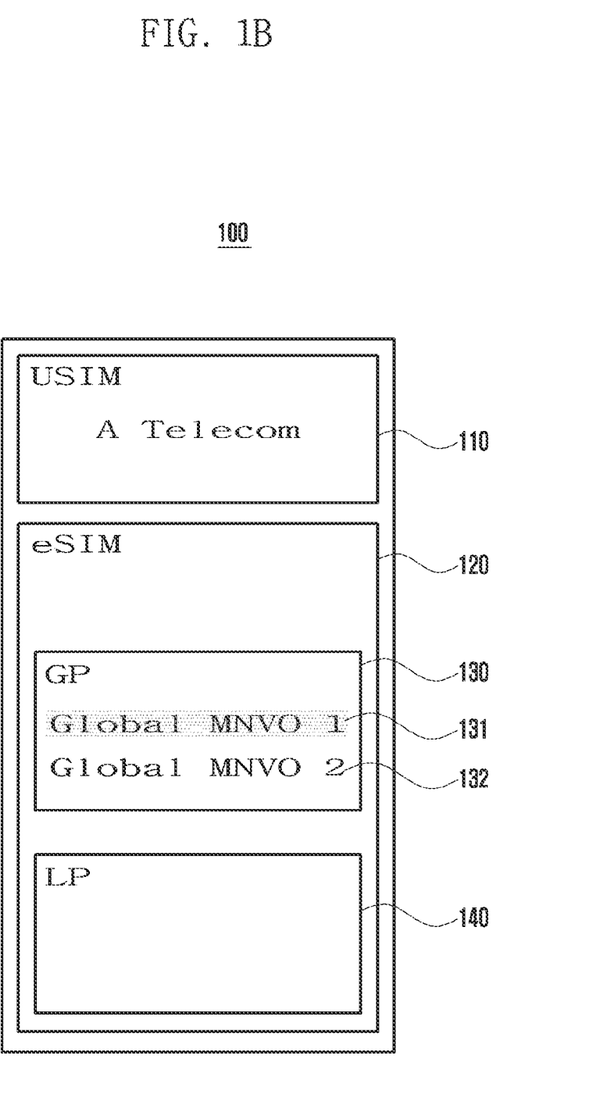

When the terminal 100 including the USIM 110 and the eSIM 120 as illustrated in FIG. 1A moves to a second region, at least one GP may be activated as illustrated in FIG. 1B.

Specifically, the terminal 100 may perform the wireless communication using the USIM 110 of 'A Telecom' as shown in FIG. 1A in a first area joined at the beginning. When the terminal 100 moves to a second area, the roaming service can be continuously provided through the USIM 110 of 'A Telecom' as shown in FIG. 1B.

At the same time, the terminal 100 may activate the GP of the mobile virtual network operator supporting the global roaming in the second area. For example, when the terminal 100 moves from Korea to the US, as illustrated in FIG. 1B, the 'Global MVNO 1' 131, which is the GP of the mobile virtual network operator supporting the global roaming in the US may be activated.

If a plurality of GPs of the mobile virtual network operator supporting the global roaming in the second area are installed, the terminal 100 may activate the GP of the mobile virtual network operator supporting the global roaming that is most suitably used.

For example, it is possible to compare signal strengths of available wireless communication networks by the global roaming, and to activate the GP of the mobile virtual network operator providing the wireless communication network with the strongest signal strength. According to another embodiment, it is possible to compare use prices of available wireless communication networks by the global roaming and to activate the GP of the mobile virtual network operator with the lowest use price. Alternatively, the terminal 100 may provide information on the mobile virtual network operator supporting the available global roaming to the user through output sections such as a display and a speaker, and activate the GP according to the user selection.

Figure 1C:
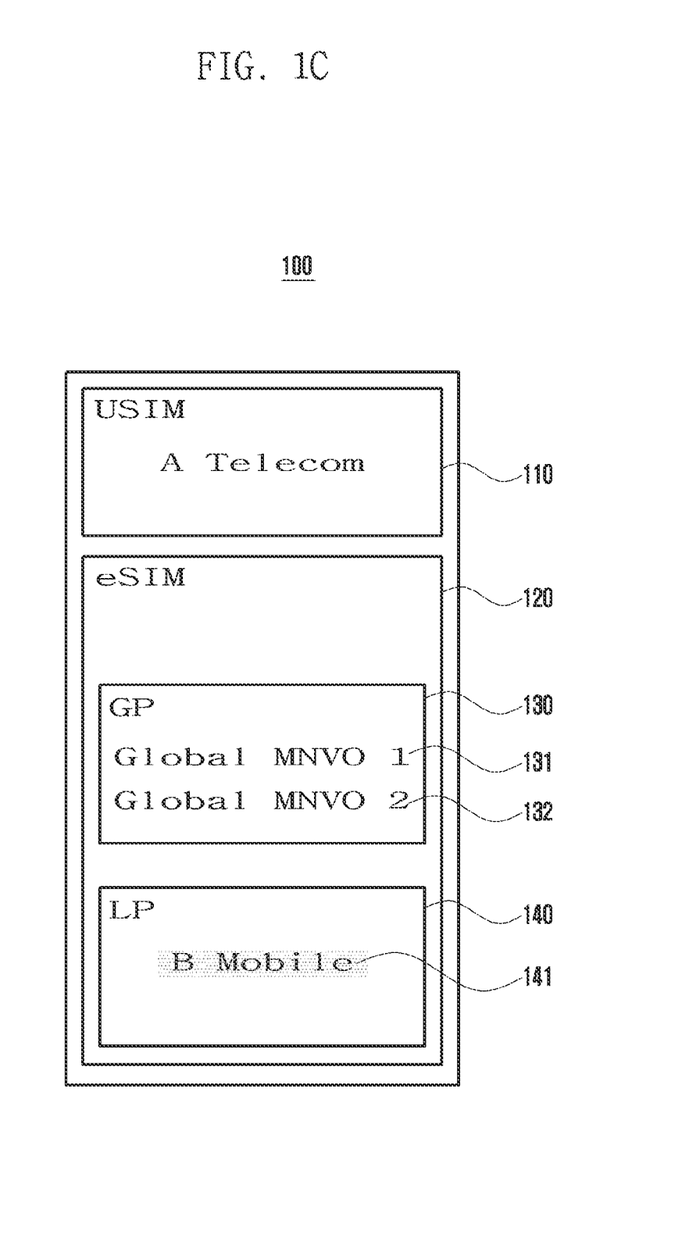

FIG. 1C is a diagram illustrating a terminal 100 in which an LP 141 of a local operator 'B Mobile' providing the wireless communication service in the second area using the GP 'Global MVNO 1' 131 activated as described above is installed.

Specifically, the terminal 100 may install an LP of an operator providing a wireless communication service in an area (or a country) where roaming is generated by using the GP 'Global MVNO 1' 131 activated as described above.

As a result, a user may use a wireless communication network of a local operator 'B Mobile' by using the installed LP 141.

On the other hand, when the GP is activated in the area (or country) where the roaming is generated but the LP of the available operator does not exist or it is impossible to join the service to the local operator and thus the LP installation fails in the eSIM 120 of the terminal 100, the user may continue to use the activated GP 'Global MVNO 1' 131 of the terminal 100 to use the wireless communication service through the global roaming.

Figure 1D:
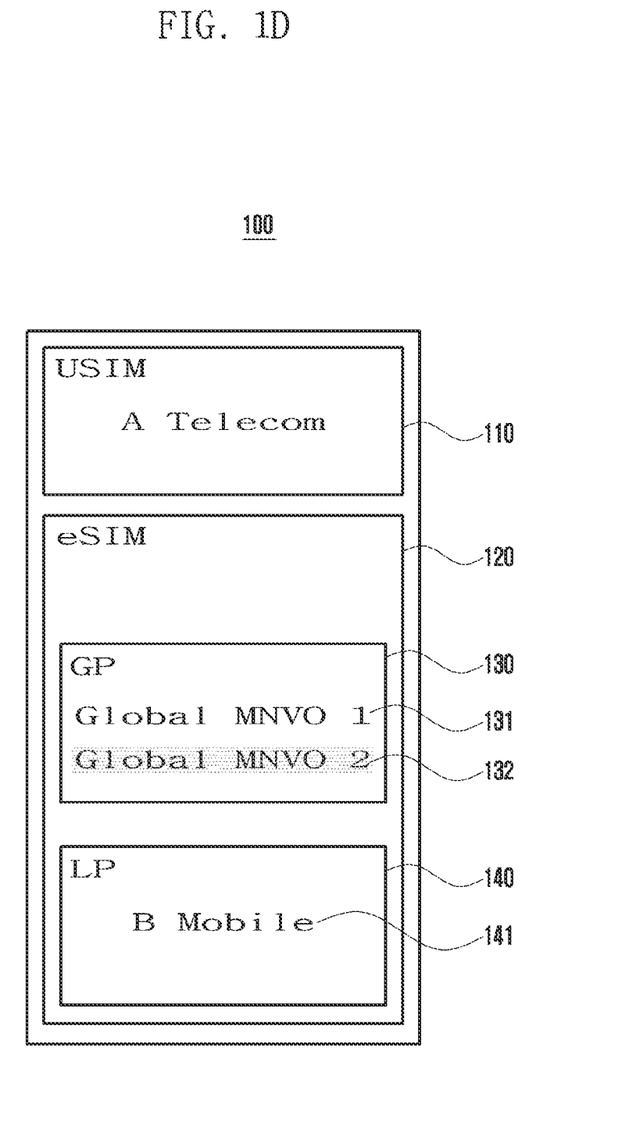

FIG. 1D is a diagram illustrating states of the USIM 110 and the eSIM 120 when the terminal 100 moves from the second area to a third area.

In detail, the terminal 100 may activate the GP of the mobile virtual network operator supporting the global roaming in the third area. For example, when the terminal 100 moves from the US to China, as illustrated in FIG. 1D, the 'Global MVNO 2' 132, which is the GP of the mobile virtual network operator supporting the global roaming in China may be activated.

If a plurality of GPs of the mobile virtual network operator supporting the global roaming in the third area are installed, the terminal 100 may activate the GP of the mobile virtual network operator that supports the global roaming that is most suitably used.

For example, it is possible to compare the signal strengths of wireless communication networks available by the global roaming, and to activate the GP of the mobile virtual network operator providing the wireless communication network with the strongest signal strength. According to another embodiment, it is possible to compare the use prices of wireless communication networks available by the global roaming and to activate the GP of the mobile virtual network operator with the lowest use price.

Alternatively, the terminal 100 may provide information on the mobile virtual network operator supporting the available global roaming to the user through the output sections such as the display and the speaker, and activate the GP according to the user selection.

Meanwhile, operator 'B Mobile' providing a wireless communication service in the second area may no longer provide the wireless communication service in the third area or supports only the roaming which requires expensive communication fee. Accordingly, the terminal 100 can deactivate the LP 141 of the 'B Mobile'. The terminal 100 may start driving of a timer for deleting the LP 141 of the 'B Mobile'. When the preset time elapses, the terminal 100 may consider that the LP 141 of the 'B Mobile' is no longer used and delete the LP 141 of the 'B Mobile' from the LP area 140.

Figure 1E:
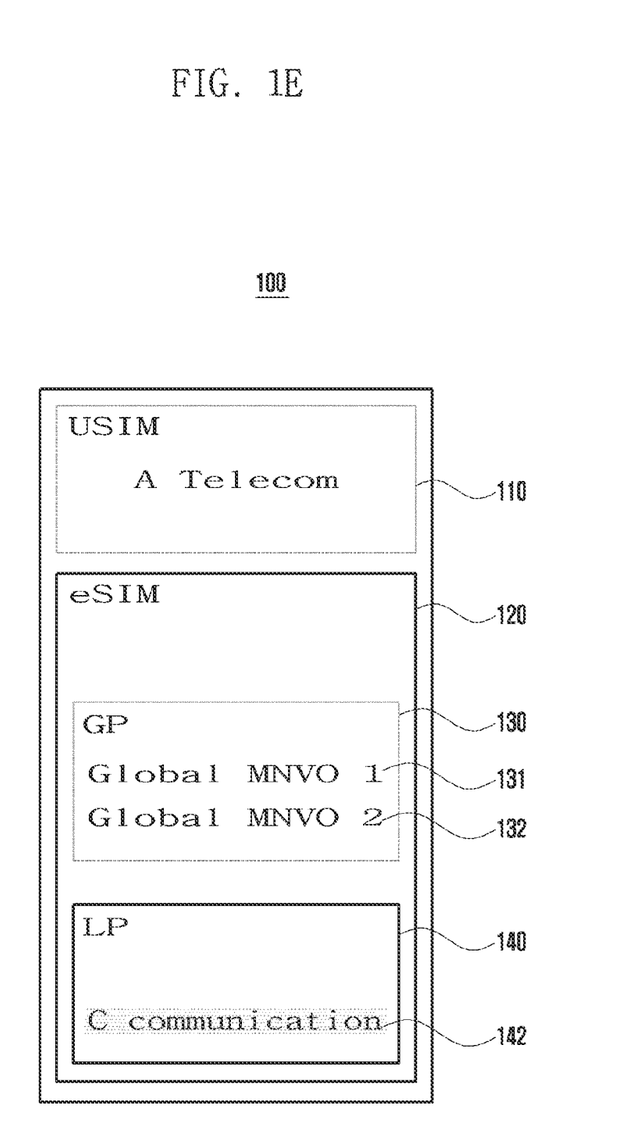

FIG. 1E is a diagram illustrating the terminal 100 in which an LP 142 of operator 'C communication' providing the wireless communication service in the third area is installed by using the activated GP 'Global MVNO 2' 132' and the LP 141 of operator 'B Mobile' installed in the second area is deleted.

Specifically, the terminal 100 may install the LP 142 of the 'C Communication' which is the local operator providing the wireless communication service in the area (or country) where the roaming is generated by using the GP 'Global MVNO 2' 132 activated as described above.

As a result, the user may use the wireless communication network of the operator 'C Communication' by using the installed LP 142.

On the other hand, when the GP is activated in the area (or country) where the roaming is generated but the LP of the available operator does not exist or it is impossible to join the service to the local operator and thus the LP installation fails in the eSIM 120 of the terminal 100, the user may continue to use the activated GP 'Global MVNO 2' 132 of the terminal 100 to use the wireless communication service through the global roaming.

In addition, FIG. 1E illustrates that the LP 141 of the 'B Mobile' installed and used in the second area is deleted, but when the LP 141 of the 'B Mobile' is set not to be deleted or when the timer of the LP 141 of the 'B Mobile' is started and the preset time does not elapse, the LP 141 of the 'B Mobile' may still exist in the LP region 140. However, the LP 141 of the 'B Mobile' may be in a deactivated state.

Figure 2:
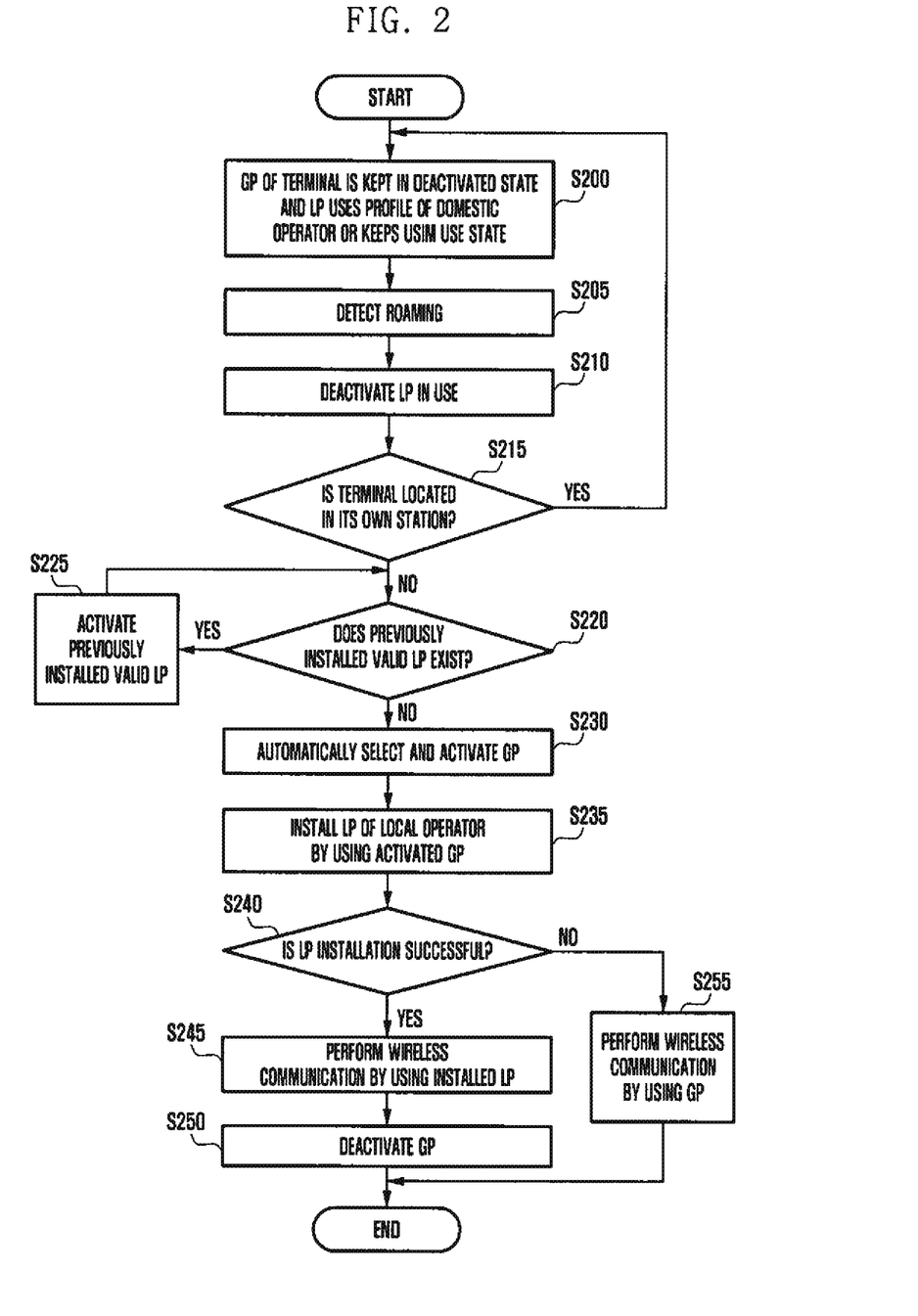
FIG. 2 is a flow chart illustrating communication method for a terminal according to an embodiment of the present disclosure.

Meanwhile, FIG. 2 is a flow chart showing a communication method of a terminal according to an embodiment of the present disclosure. Each step of the communication method illustrated in FIG. 2 may be performed continuously or discontinuously. For example, it may take any time before the terminal performs step S200 and performs step S205.

In addition, the terminal proceeding to step S250 may perform step S250 and then loop-back to step S200. For example, in the flowchart of FIG. 2, the ending step may not mean that the terminal ends the communication.

Hereinafter, the flowchart of FIG. 2 will be described in detail.

First, in step S200, the GP of the terminal is in a deactivated state, and the terminal may use the LP of the domestic operator or the local operator, or use the wireless communication service by using the USIM of the domestic operator. Here, the 'country' may mean the first area in which the terminal is joined in the wireless communication service. Here, the 'local' may mean areas other than the first area in which the terminal is joined in the wireless communication service. The terminal may use the wireless communication service by using the USIM provided by the domestic operator when joined in the service. Alternatively, if the operator of the service in which the terminal is joined provides the wireless communication service through the eSIM, the terminal may use the wireless communication service using the LP of the domestic operator installed in the eSIM of the terminal. Alternatively, when the terminal previously succeeds in installing the LP of the local operator in areas other than the first area, the terminal may use the wireless communication service by using the LP of the local operator.

In step S205, the terminal may detect the roaming. The roaming may mean movement of the terminal to locations other than a location where the wireless communication service is provided by using a communication network directly owned by the domestic operator or the local operator that provides the LP or the USIM which is in use by the terminal in step S200.

Accordingly, when it is detected that the wireless communication service provided through the communication network directly owned by the joined domestic operator cannot be used, in step S210, the terminal may use the roaming service or deactivate the LP which is in use.

For example, when the terminal uses the wireless communication service in the second area different from the first area using the LP, the LP may be deactivated.

However, if the roaming is detected when the terminal is using the mobile communication service using the USIM, the terminal does not need to deactivate the USIM. In this case, if the operator providing the USIM may provide the roaming service, the user may use the USIM of the terminal to use the wireless communication service through the roaming service.

In step S215, the terminal may determine whether the terminal is located in its own station. For example, the terminal may determine the currently located country by referring to radio base station signals around the terminal. However, if the terminal is not located in its own station, the terminal may determine whether there are a valid LP already installed other than the deactivated LP (step S220).

As the determination result, if there is the valid LP already installed, the terminal may activate the valid LP already installed in step S225. The wireless communication service may be used by using the activated LP.

For example, the valid LP already installed may mean an LP which is deactivated due to the change in the location of the terminal and in which the timer starts to be driven. Therefore, when the location of the terminal is changed again to the location where the wireless communication may be performed using the valid LP already installed before the preset time elapses, the terminal may activate the valid LP already installed.

On the other hand, if there is no valid LP already installed, the terminal can automatically select and activate the GP in step S230. In detail, at least one global profile (GP) may be installed in the eSIM of the terminal. When the plurality of GPs are installed, each of the GPs may be different from a country that supports the global roaming. Accordingly, the terminal may activate the GP of the mobile virtual network operator supporting the global roaming at the location where the roaming is detected.

In addition, if the plurality of GPs of the mobile virtual network operator supporting the global roaming at the location where the roaming is detected are installed, the terminal may activate the GP of the mobile virtual network operator supporting the global roaming that is most suitably used.

For example, it is possible to compare the signal strengths of wireless communication networks available by the global roaming, and to activate the GP of the mobile virtual network operator providing the wireless communication network with the strongest signal strength. According to another embodiment, it is possible to compare the use prices of wireless communication networks available by the global roaming and to activate the GP of the mobile virtual network operator with the lowest use price.

Alternatively, the terminal 100 may provide information on the mobile virtual network operator supporting the available global roaming to the user through the output sections such as the display and the speaker, and activate the GP according to the user selection.

In step S235, the terminal can install the LP of the local operator using the activated GP. In step S240, the terminal can determine whether the LP installation is successful.

Specifically, according to the activated GP, the terminal may install the LP of the local operator providing the wireless communication service at the location where the roaming is detected by using the wireless communication network of the mobile virtual network operator supporting the global roaming.

As described above, when the roaming service using the USIM is also provided, the terminal can install the LP using the USIM or the GP according to the setting or the user selection.

If the LP of the local operator is successfully installed, in step S245, the terminal can perform the wireless communication using the installed LP. In step S250, the terminal may deactivate the GP.

On the other hand, if it is determined in step S240 that the LP installation fails, the terminal may perform the wireless communication using the activated GP in step S255.

With the above-described method, the user can use the wireless communication service at a lower cost at the time of the roaming through the terminal.

Figure 3:
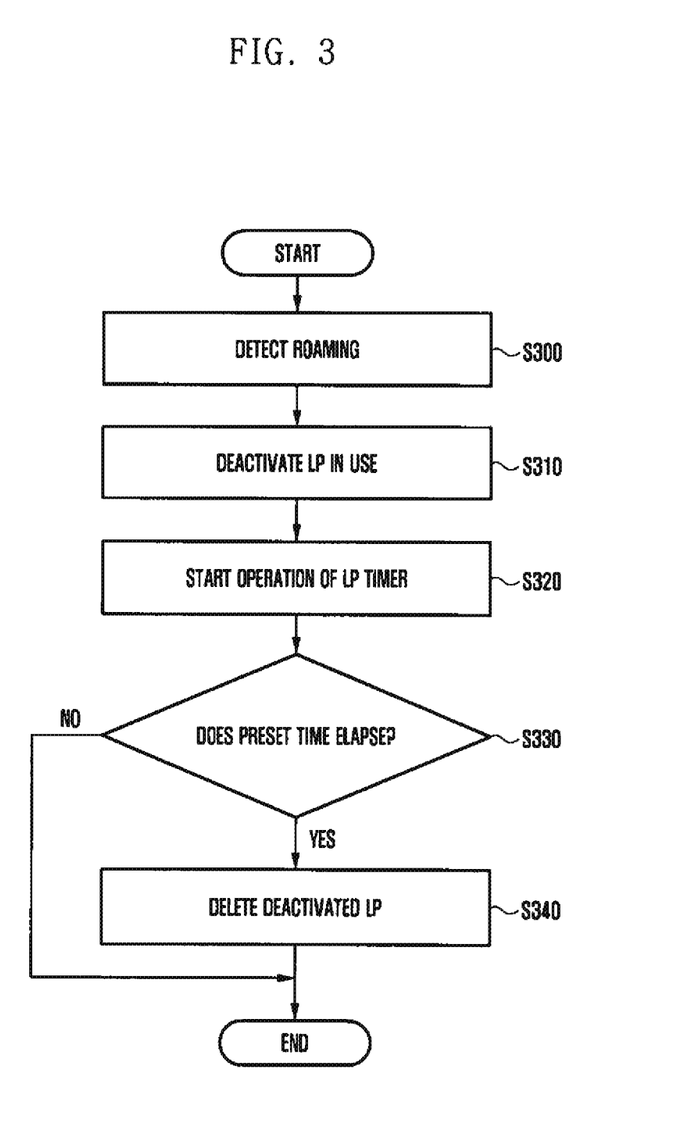
FIG. 3 is a flow chart illustrating a method for deleting a local profile according to an embodiment of the present disclosure.

Meanwhile, FIG. 3 is a flow chart illustrating a method for deleting a local profile according to an embodiment of the present disclosure.

As described above, the LP installed in the terminal may be deleted when any condition is satisfied. Hereinafter, a specific method of deleting the LP will be described with reference to FIG. 3.

First, in step S300, the terminal may detect the roaming. In step S310, the terminal can deactivate the LP which is in use.

Specifically, when the terminal is joined in the wireless communication service in the first area, the LP of the wireless communication service operator in which the terminal is joined may be installed. The terminal may use the wireless communication service of the service operator through the installed LP.

Alternatively, when the terminal is joined in the wireless communication service in the first area, the terminal may receive the USIM from the wireless communication service operator in which the terminal is joined to use the wireless communication service. When the terminal moves from the first area to the second area, according to the above-described method, the LP of the operator providing the wireless communication service in the second area may be installed to use the wireless communication service.

When the roaming is detected in the terminal that has performed the wireless communication through the LP by the above-described method, in step S310, the terminal can deactivate the LP which is in use. The deactivation of the LP may not mean the deletion of the LP. However, the deactivation of the LP may mean that the terminal no longer performs the wireless communication using the LP.

In step S320, the terminal may start the LP timer operation. For example, when the terminal returns from the second area to the first area, since the deactivated LP can be reused, the terminal may start the timer operation of the LP to count the elapsed time from the start of the deactivation of the LP.

In step S330, it is determined whether the preset time has elapsed. If it is determined that the preset time has elapsed, the terminal can delete the deactivated LP in step S340. For example, if the preset time has elapsed from the start of deactivation of the LP, the terminal may determine that the possibility of using the LP is low to delete the LP.

On the other hand, if an event for activating the deactivated LP is generated after the timer starts to be driven, the terminal may activate the LP. For example, if it is determined that the terminal exists again at the location where the wireless communication may be performed by using the LP, the terminal may activate the LP.

Figure 4:
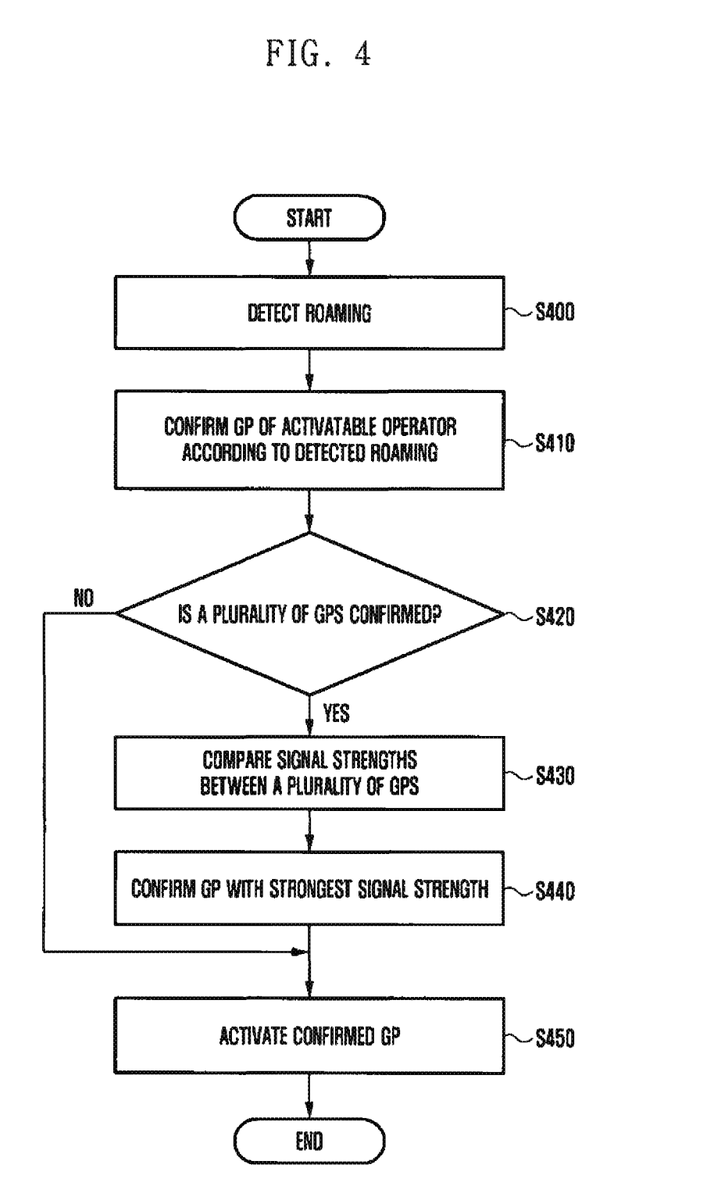
FIG. 4 is a flow chart illustrating a method for activating a global profile according to an embodiment of the present disclosure.

FIG. 4 is a flow chart illustrating a method for activating a global profile according to an embodiment of the present disclosure.

First, in step S400, the terminal may detect the roaming. In step S410, the terminal may identify the GP of the activatable operator according to the detected roaming. For example, the terminal may previously store the GP which is a profile provided by the global MVNO operator. Since one global MVNO operator is unable to support the global roaming in all countries, the terminal may include the plurality of GPs depending on the area where each global MVNO operator supports the global roaming.

Accordingly, in step S420, if the plurality of GPs are identified, in step S430, the terminal can compare the signal strengths between the plurality of GPs. In step S440, the terminal may identify the GP having the strongest signal strength to activate the identified GP in step S450.

For example, the terminal may compare the signal strengths of available wireless communication networks by using each GP, and to activate the GP of the operator of the wireless communication network with the strongest signal strength.

Activating the GP according to the signal strength is merely an example, and the terminal may compare the use prices of the available wireless communication network by the global roaming and activate the GP of the operator with the cheapest use price.

Alternatively, the terminal 100 may provide the information on the operator supporting the available global roaming to the user through the output sections such as the display and the speaker, and activate the GP according to the user selection.

On the other hand, if only one GP is identified without identifying the plurality of activatable GPs, the terminal can activate the identified GP in step S450.

Figure 5:
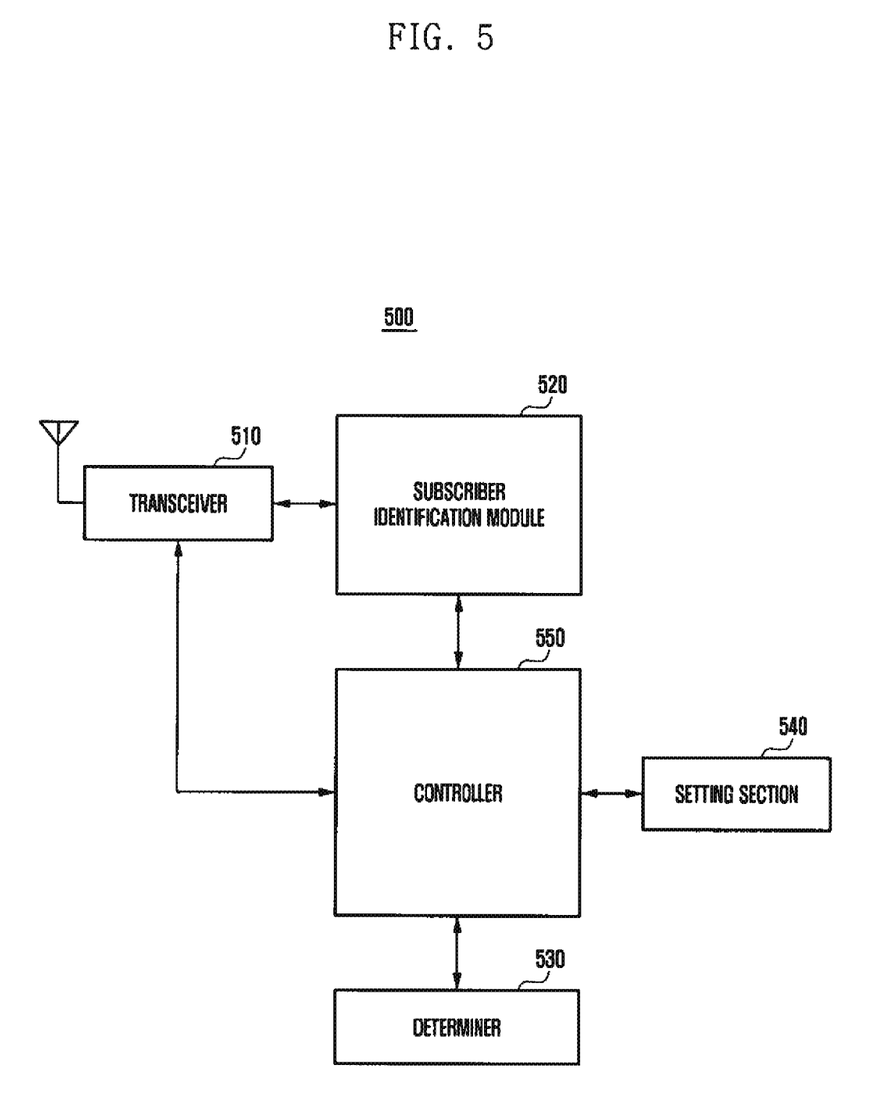
FIG. 5 is a block diagram illustrating a configuration of a terminal according to an embodiment of the present disclosure.

Meanwhile, FIG. 5 is a block diagram illustrating a configuration of a terminal according to an embodiment of the present disclosure. As illustrated in FIG. 5, the terminal 500 may include a transceiver 510, a subscriber identification module (SIM) 520, a determiner 530, a setting section 540, and a controller 550.

The transceiver 510 is a component for transmitting and receiving a signal to and from an external device.

The subscriber identification module (SIM) 520 may include at least one USIM and eSIM. According to an embodiment of the present disclosure, the eSIM of the terminal 500 may include the GP region for installing the profile of the global MVNO supporting the global roaming in at least one country, and the LP region for installing the profile of the operator providing the wireless communication service in the corresponding roaming region at the time of roaming. However, this is merely an embodiment, and the physical region of the SIM 520 may not be divided.

Also, the SIM 520 may include at least one GP. For example, the GP of the MVNO supporting the global roaming in the US, Canada or the like and the GP of the MVNO supporting the global roaming in China, India or the like may be installed in the SIM 520 in advance.

In addition, at least one of the above-described GPs may be in the deactivated state until the terminal 500 detects the roaming.

When the roaming is detected based on the signal received through the transceiver 510, the determiner 530 may determine the GP to be activated. For example, the terminal 500 may identify a country code included in the signal received through the transceiver 510. If the determined country code is different from the country code in the region where the terminal 500 is initially joined, the terminal 500 may determine that the roaming is detected.

Alternatively, the terminal 500 may use GPS to determine that the current location of the terminal 500 is different from the first joined area. The terminal 500 may identify whether or not the roaming is generated by using the GPS when the preset event (for example, turn on/off of a power supply of the terminal) is generated at the preset time interval.

The above-described methods are merely an embodiment, and the terminal 500 may detect the roaming by various methods using the received signal, the included sensor or the like.

The setting section 540 is a component for setting the installation and activation of the previously installed GP and LP. The controller 550 may install the GP activation and the LP according to the determination result of the determiner 530 and the setting of the setting section 540.

Specifically, if the GP to be activated is determined by the determiner 530, the controller 550 may receive information on the determined GP from the determiner 530. The controller 550 may activate the GP installed in the SIM 520 or receive the LP through the transceiver 510.

The activation of the GP as described above may be performed automatically according to the roaming area. Meanwhile, an instruction for whether to activate the GP or the selection of the GP to be activated may be set from the user through the setting section 540.

Specifically, the setting section 540 may output information for selecting whether to activate the GP through the output unit (e.g., a display, a speaker) of the terminal 500. For example, when a UI for selecting whether to activate the GP is displayed on the display (not shown) of the terminal 500, the GP may be activated or deactivated according to the user selection through the displayed UI.

Alternatively, if the plurality of GPs that can be activated are determined by the determiner 530, the UI for selecting one GP may be displayed on the display (not shown) of the terminal 500. The GP to be activated may be selected according to the user selection through the displayed UI.

Accordingly, the controller 550 may install the GP activation and the LP according to the determination result of the determiner 530 and the setting result of the setting section 540 as described above.

Meanwhile, the determiner 530 and the setting section 540 of the terminal 500 are shown as separate components from the controller 550, which is merely an embodiment, and the controller 550 may include the determiner 530 and the setting section 540. Alternatively, the controller 550 may also serve as the determiner 530 and the setting section 540.

When the roaming is generated by the terminal 500 as described above, the user may continue to use the wireless communication service at a lower cost.

Meanwhile, the components of the terminal described above may be implemented by software. For example, the controller of the terminal may further include a flash memory or other nonvolatile memories. In the nonvolatile memory, a program for performing each role of the controller may be stored.

Further, the controller of the terminal may be implemented in a form including a CPU and a random access memory (RAM). The CPU of the controller may copy the above-described programs stored in the nonvolatile memory into the RAM, and then execute the copied programs to perform the functions of the terminal as described above.

The controller is a component which is responsible for the control of the terminal. The controller may be used in the same meaning as a central processing unit, a microprocessor, a processor, an operating system, or the like. Further, the controller of the terminal may be implemented as a system-on-a-chip or a system on chip (SOC or SoC) along with other function sections such as the communication module included in the terminal.

Meanwhile, the communication method of the terminal according to various exemplary embodiments of the present disclosure as described above may be stored in a non-transitory readable medium while being coded in software. The non-transitory readable medium may be used while being equipped in various apparatuses.

The non-transitory readable medium is not a medium that stores data for a while, such as a register, a cache, and a memory, but means a medium that semi-permanently stores data and is readable by a device. In detail, the non-transitory readable medium may be a CD, a DVD, a hard disc, a Blueray disc, an USB, a memory card, an ROM, etc.

Although the exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should also be understood to fall within the scope of the present disclosure.

The invention claimed is:

1. A communication method performed by a terminal, comprising:
    installing at least one global profile (GP);
    identifying a location of the terminal, based on a change in the location of the terminal being detected after the at least one GP is installed;
    determining whether a first local profile (LP) is installed valid for operating in the identified location, wherein the LP does not support global roaming;
    comparing signal strengths of one or more GPs corresponding to available wireless communication networks according to the identified location, based on a result of the determination;
    activating a first GP corresponding to the location of the terminal among the one or more GPs, based on the compared signal strengths;
    installing a second LP for supporting communication at the location by using the first GP, the second LP being a profile of an operator supporting the wireless communication service at the location of the terminal, which is different from the first LP; and performing wireless communication by using the first GP or the second LP based on whether the LP installation is successful.

2. The communication method of claim 1, wherein the GP is a profile for performing the wireless communication by using a global mobile virtual network operator (MVNO).

3. The communication method of claim 1, wherein the performing of the wireless communication further comprising:
in case that the second LP installation is successful, deactivating the GP; and
performing the wireless communication by using the installed second LP.

4. The communication method of claim 1, wherein the performing of the wireless communication further comprising:
performing the wireless communication by using the GP in case that the second LP installation fails,
wherein in case that the second LP installation fails, an LP of an available operator is not identified or a join the service to a local operator of the second LP is failed.

5. The communication method of claim 1, wherein the activating further comprising:
detecting roaming;
identifying the GP of an activatable operator according to the detected roaming; and
activating the identified GP.

6. The communication method of claim 5, wherein the identifying further comprising:
in case that the number of identified GP is plural, selecting a GP of the wireless communication with the strongest signal strength or a GP of the wireless communication with the cheapest roaming fee.

7. The communication method of claim 3, further comprising:
detecting a change of the location of the terminal to a location where the wireless communication is not performed by using the second LP, while the wireless communication is performed using the second LP;
deactivating the second LP;
starting driving of a timer for the second LP; and
deleting the second LP in case that the driving of the timer starts and a preset time elapses,
wherein the installing further includes:
activating the previously installed first LP in case that the first LP supporting the communication is previously installed at the identified location.

8. A terminal, comprising:
a transceiver configured to transmit and receive a signal; and
a controller configured to install at least one global profile (GP), identify a location of the terminal, based on a change in the location of the terminal being detected after the at least one GP is installed, determine whether a first local profile (LP) is installed valid for operating in the identified location, wherein the LP does not support global roaming, compare signal strengths of one or more GPs corresponding to available wireless communication networks according to the identified location, based on a result of the determination, activate a first GP corresponding to the location of the terminal among the one or more GPs, based on the compared signal strengths, install a second LP for supporting communication at the location through the transceiver by using the first GP, the second LP being a profile of an operator supporting the wireless communication service at the location of the terminal, which is different from the first LP, and control the transceiver to perform wireless communication by using the first GP or the LP based on whether the second LP installation is successful.

9. The terminal of claim 8, wherein the GP is a profile for performing the wireless communication by using a global mobile virtual network operator (MVNO).

10. The terminal of claim 8, wherein the controller is further configured to deactivate the GP and perform the wireless communication using the installed second LP, in case that the second LP installation is successful.

11. The terminal of claim 8, wherein the controller is further configured to perform the wireless communication using the GP in case that the second LP installation fails,
wherein in case that the second LP installation fails, an LP of an available operator is not identified or a join the service to a local operator of the second LP is failed.

12. The terminal of claim 8, wherein the controller is further configured to identify a GP of an activatable operator according to the detected roaming and activate the identified GP, if roaming is detected.

13. The terminal of claim 12, wherein the controller is further configured to, in case that the number of identified GP is plural, select a GP of the wireless communication with the strongest signal strength or a GP of the wireless communication with the cheapest roaming fee.

14. The terminal of claim 10, wherein if a change of the location of the terminal to a location where the wireless communication is not performed by using the second LP is detected while the wireless communication is performed using the second LP, the second LP is deactivated, a timer for the second LP starts, the driving of the timer starts, and in case that the preset time elapses, the second LP is deleted.

15. The terminal of claim 8, wherein the controller is further configured to activate the previously installed first LP in case that the first LP supporting the communication at the location is previously installed.

* * * * *